INVENTORS
JOHN W. BERKMAN
RICHARD E. JONES
PAUL D. SENSTAD
BY Ralph L. Wugger
ATTORNEY

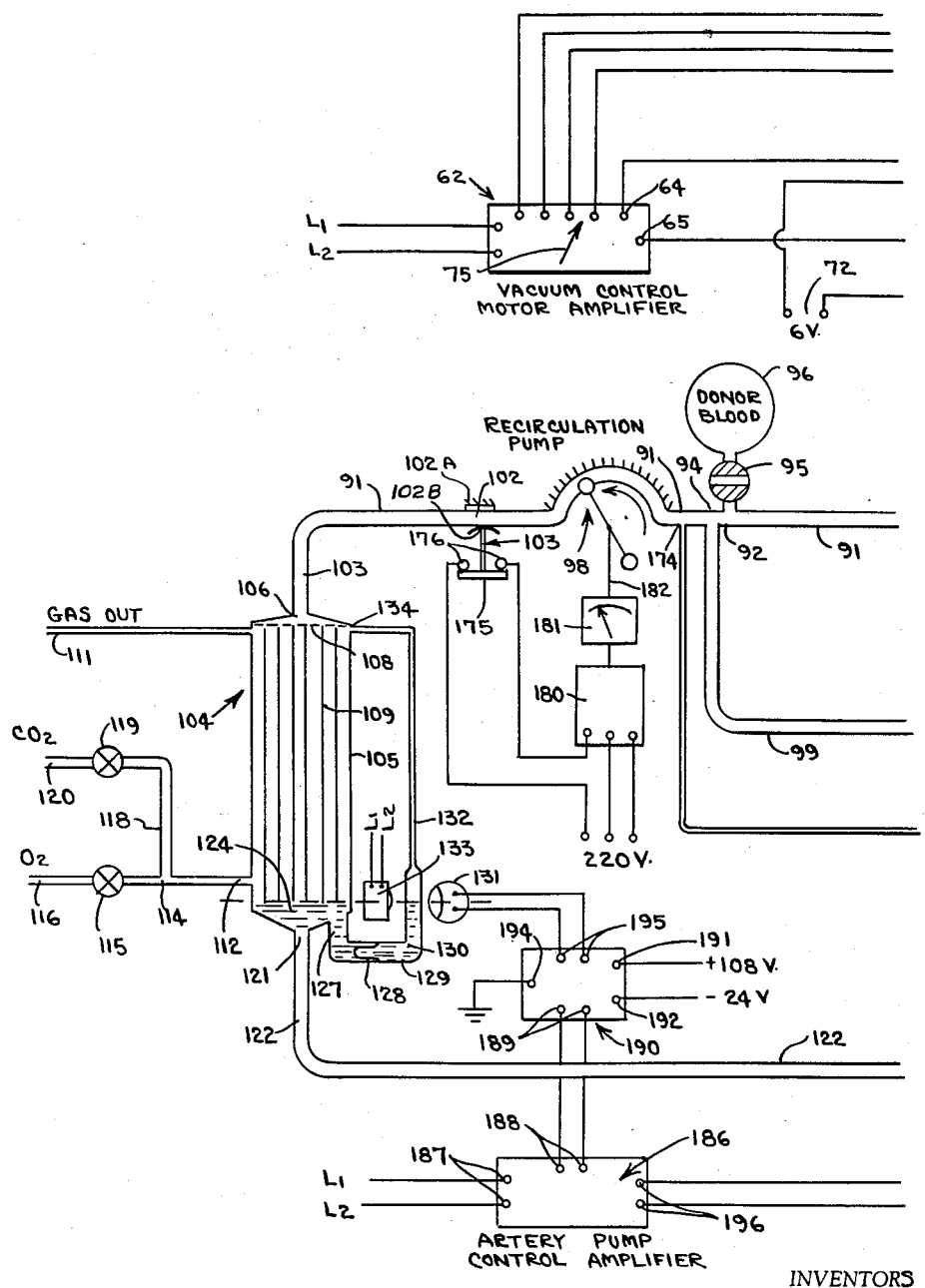

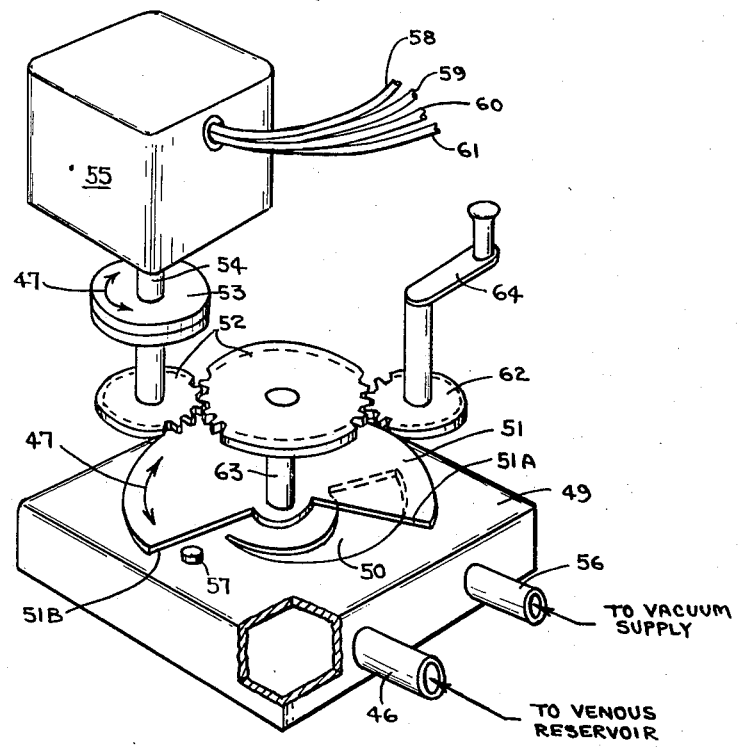

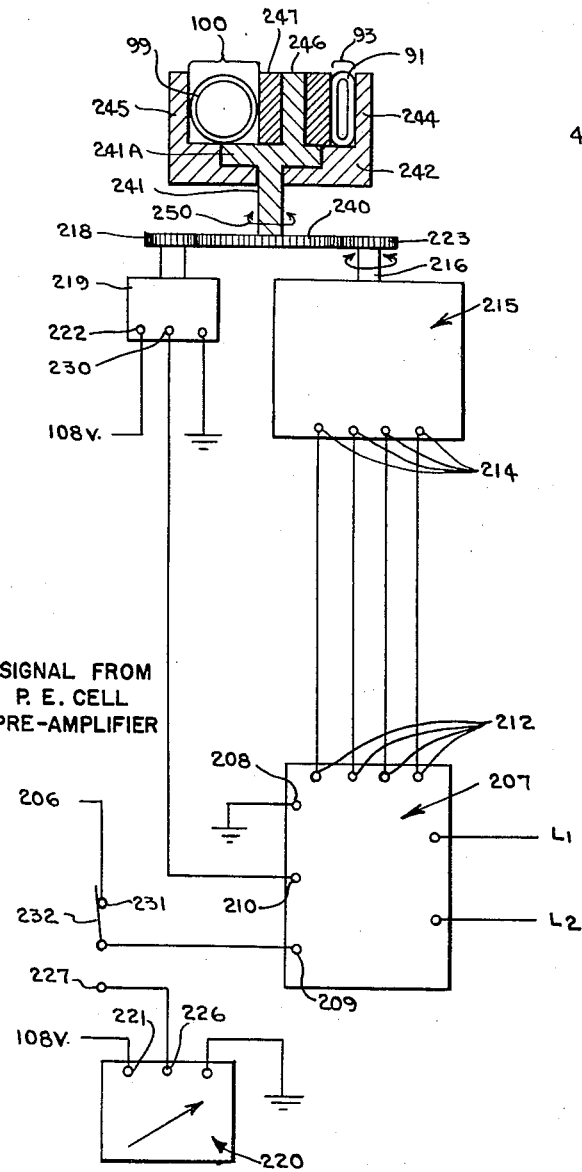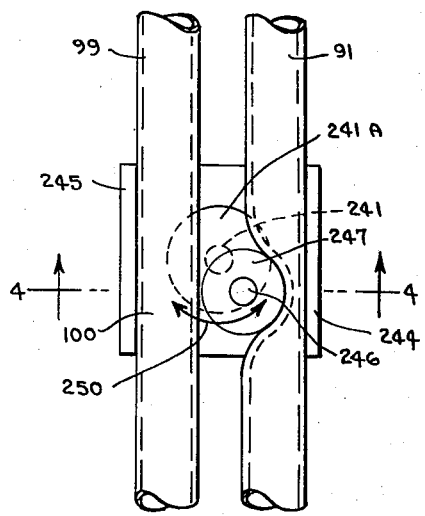

March 8, 1960
J. W. BERKMAN ET AL
2,927,582
PUMP-OXYGENATOR
Filed March 19, 1956
8 Sheets-Sheet 5
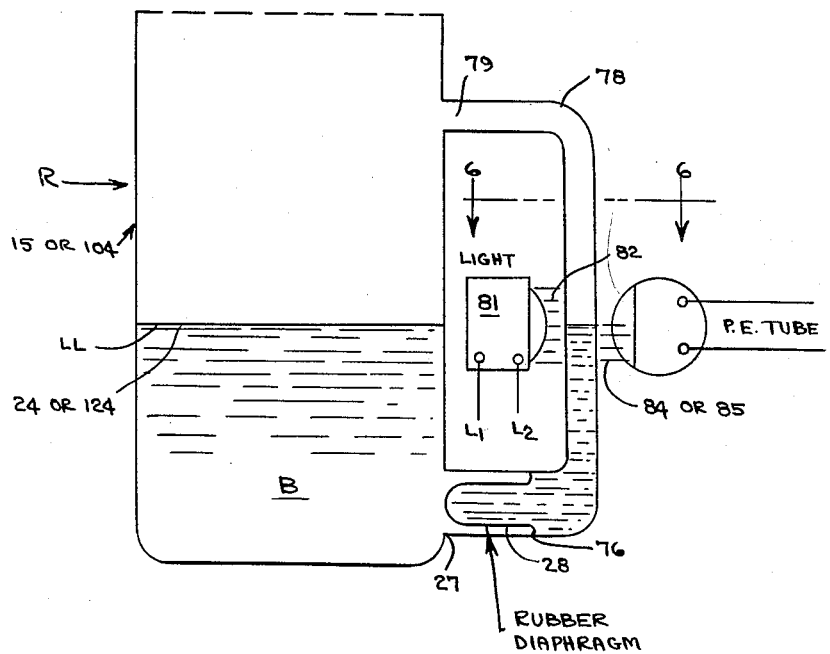
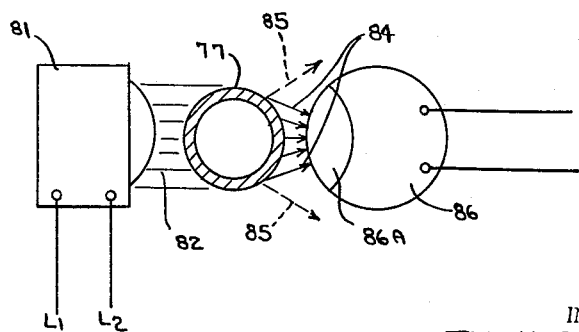
INVENTORS
JOHN W. BERKMAN
RICHARD E. JONES
BY PAUL D. SENSTAD
Ralph L. Dugger
ATTORNEY

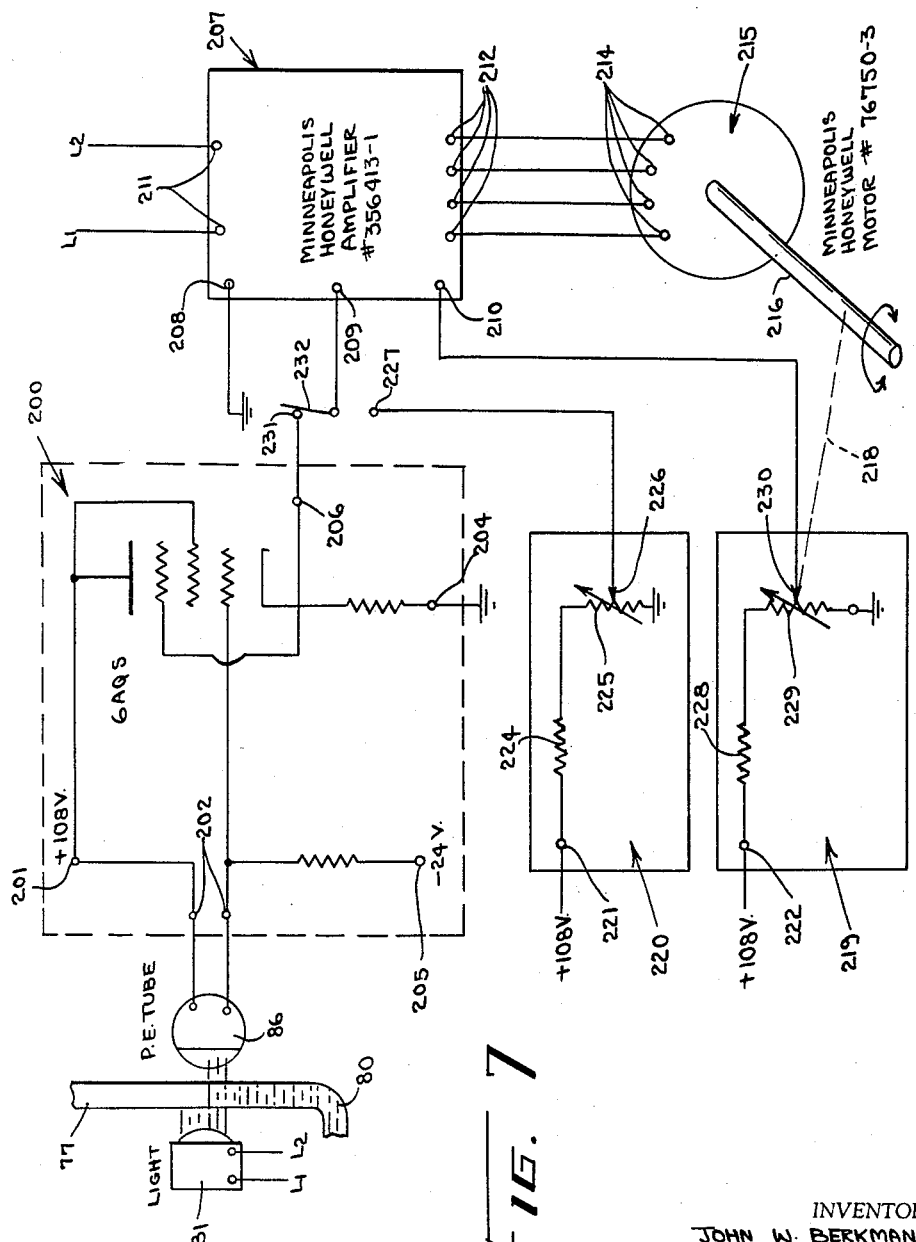

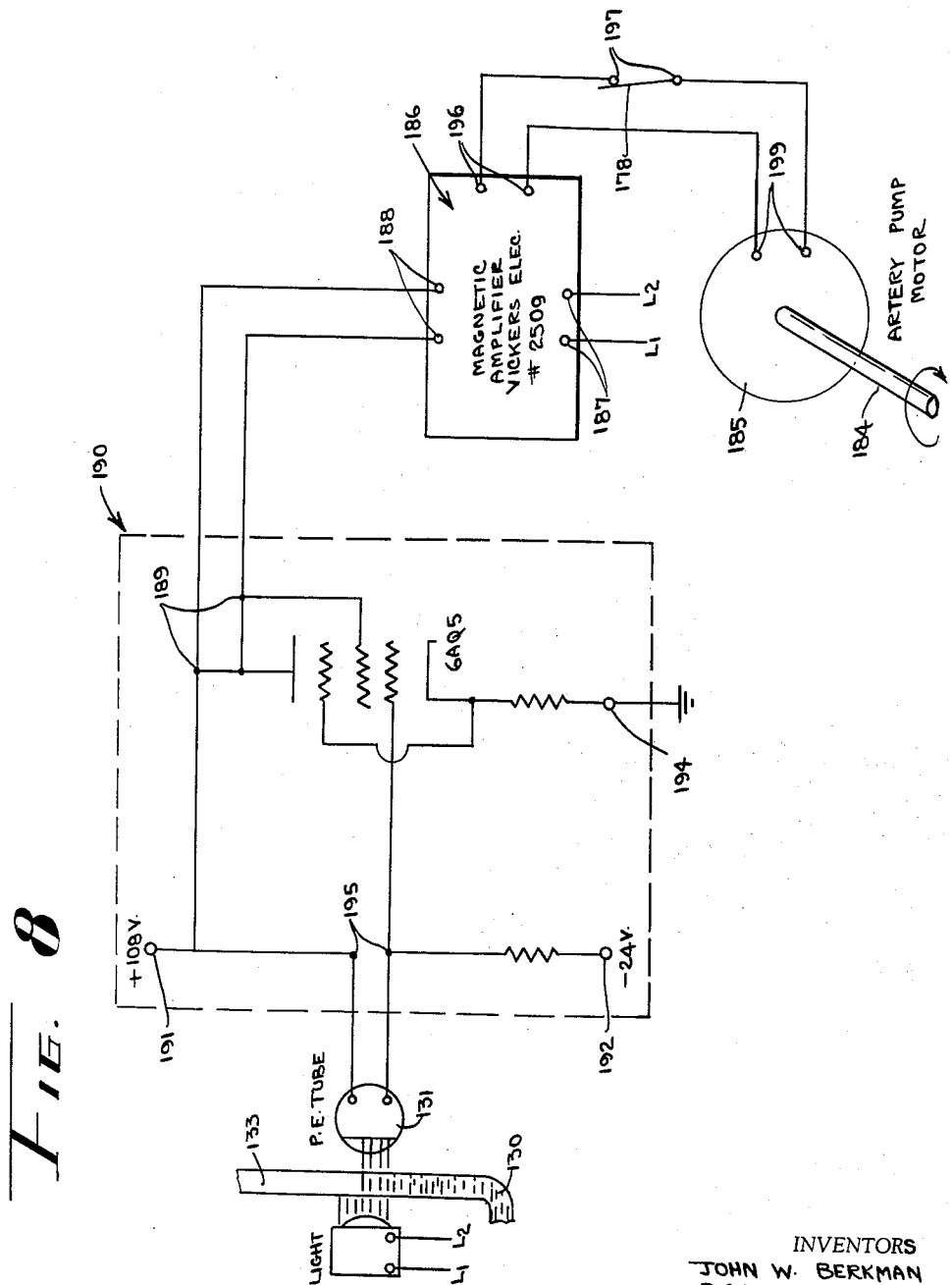

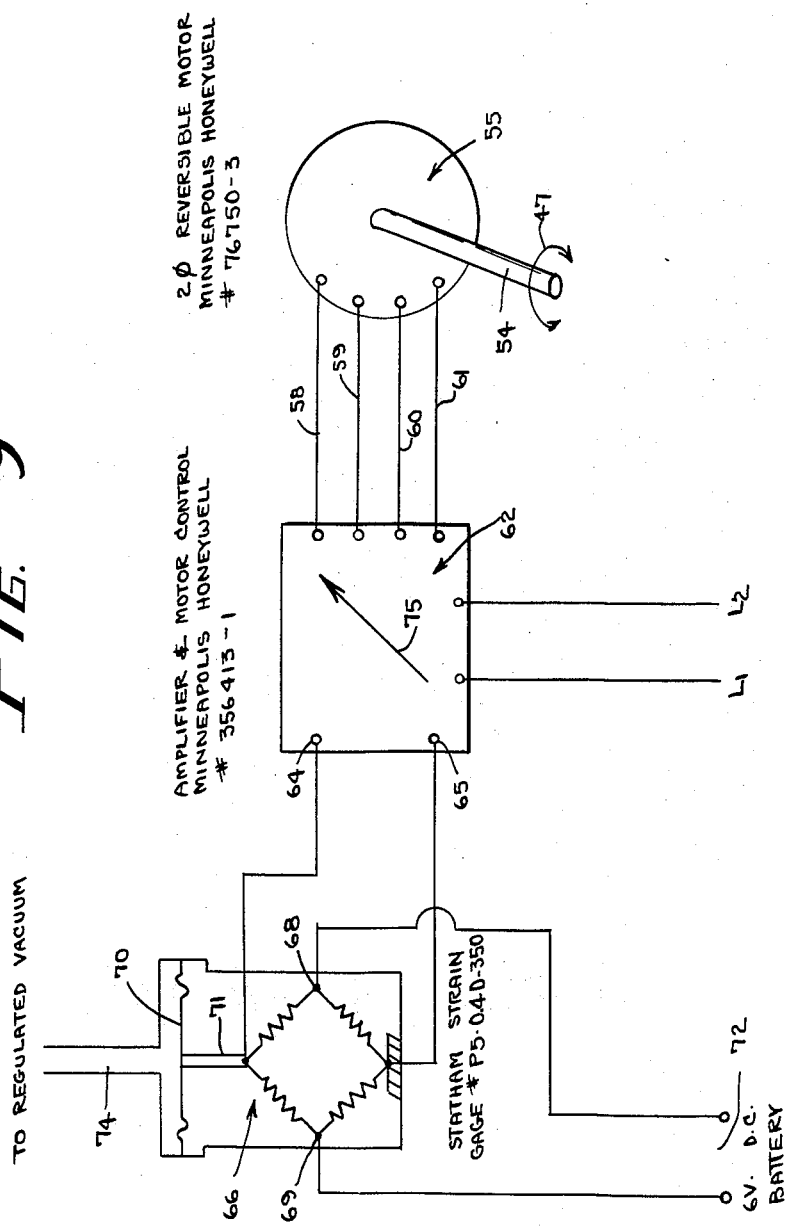

United States Patent Office 2,927,582
Patented Mar. 8, 1960

2,927,582

PUMP-OXYGENATOR

John W. Berkman and Richard E. Jones, Rochester, and Paul D. Senstad, Minneapolis, Minn., assignors, by mesne assignments, to Research Corporation, New York, N.Y., a corporation of New York Application March 19, 1956, Serial No. 572,389

18 Claims. (Cl. 128—214)

This invention relates to improved devices, capable of assuming the functions of the heart and lungs of a human being, during such period as may be required for exposing the chambers of the heart to the direct vision of the surgeon, for performance of corrective thoracic surgery. For convenience in nomenclature such apparatus, in its entirety, is called a "Pump-Oxygenator."

The art of thoracic surgery was much advanced by the work of John H. Gibbon and his co-workers. The apparatus, developed and perfected by them for use in such surgery, is covered by U.S. Patents 2,659,368; 2,705,493 and related patents. It is in respect to apparatus of this type that the present invention forms an improvement.

In the Gibbon et al. apparatus venous blood from the patient is withdrawn by a pump, denoted a venous pump, and the blood is delivered, in some instances by an additional pump into an oxygenator, from which it is withdrawn by an artery pump and returned to the patient. The blood circulated thru the oxygenator includes not only that which is withdrawn from the patient but also a certain amount may be recirculated, some of that which is recirculated being blood from the artery delivery system which is returned back to the vein pump system. The amount of blood so recirculated is manually adjusted in the Gibbon apparatus.

We have found that optimum venous blood withdrawal from the patient is obtained and that danger of collapse of the patient's veins is minimized when an improved venous blood withdrawal system is utilized, and it is an object of the present invention to provide such improvements. More particularly it is an object of the invention to provide an improved pump-oxygenator wherein the venous blood withdrawal from the patient is by virtue of a system of apparatus in which a closely regulated pressure is maintained, at a pressure level such that when venous blood cannula or cannulas are connected to the patient there will be maintained, at the point of blood withdrawal in the central venous system of the patient, a pressure within the range of, and preferably approximating the mean pressure of, said venous system during normal physiology of the patient as determined by pre-operative measurements of such central venous pressure.

In the prior art systems of which this invention constitutes improvement, some recirculation of partially or completely oxygenated blood thru the oxygenator segment of the system was used, but the amount or proportion of such recirculated blood as compared to the venous blood inflow was either not regulated at all or was manually adjusted arbitrarily. It has been discovered that the venous blood inflow from the patient and arterial blood delivery to the patient vary at different stages of the surgical procedure and it is the desideratum that such may be conveniently accommodated, and that within minor limits of rate variation, the amount of arterial blood returned should equal the amount of venous blood withdrawn. It is an object of this invention to provide an improved pump-oxygenator apparatus accommodating these requisites and more especially to provide, automatically and continuously to adjust the amount of recirculated blood so as to maintain substantially constant the volume of blood passed thru the oxygenator, while automatically accommodating variations of inflow and delivery to the patient.

In thoracic surgery a cardiotomy is performed in order that the surgeon may complete the delicate repairs needed. During such, the heart continues to beat, and its own blood supply, which is normally returned by the coronary sinuses is lost thru the resected organ. With the heart resected and according to prior surgical procedures, the blood supply of the heart itself was collected, usually by a vacuum system, and was then rejected from the recirculatory system of the pump-oxygenator. One reason for this was because vacuum collection not only draws in the blood returned by the coronary sinuses but also a certain amount of air from the open patient, and bubbles and foam resulted in such collected blood. As no means has heretofore been available for safely separating the bubbles and foam, and as the amount of blood thus lost, while appreciable, was not excessive, it has been the practice to reject such intermixed blood, and bubbles and to make up the loss by donation.

It is an object of this invention to provide an improved pump-oxygenator in which the coronary sinus blood is collected, separated from air which is inevitably also drawn in, and safely returned to the system.

Other and further objects are those inherent in the apparatus herein illustrated, described or claimed.

The invention is illustrated with reference to the drawings wherein,

Figures 1A and 1B are related views and should be placed side-by-side with Figure 1A at the left and Figure 1B at the right and considered together. These figures are schematic views and diagrammatically show a complete pump-oxygenator embodying the present inventions;

Figure 2 is an isometric view of the vacuum valve apparatus forming one component of the organization;

Figure 3 is a plan view of the occluder valve mechanism which forms one segment of the pump-oxygenator organization;

Figure 4 is related to Figure 3, and in part shows a vertical sectional view taken along the line and in the direction of arrows 4—4 of Figure 3. The circuits shown in Figure 4 are for the occluder valve mechanism control;

Figure 5 is a vertical sectional view of a photo-electric liquid level control apparatus of the type utilized at several locations as components in the pump-oxygenator apparatus;

Figure 6 is a horizontal sectional view taken along the line and in the direction of arrows 5—5 of Figure 5;

Figure 7 is a wiring diagram of the occluder-valve mechanism motor mechanism controls;

Figure 8 is a wiring diagram of the artery pump motor mechanism controls;

Figure 9 is a wiring diagram of the vacuum valve mechanism motor and its associated controls.

Throughout the drawings corresponding numerals refer to the same elements.

Figure 1B:
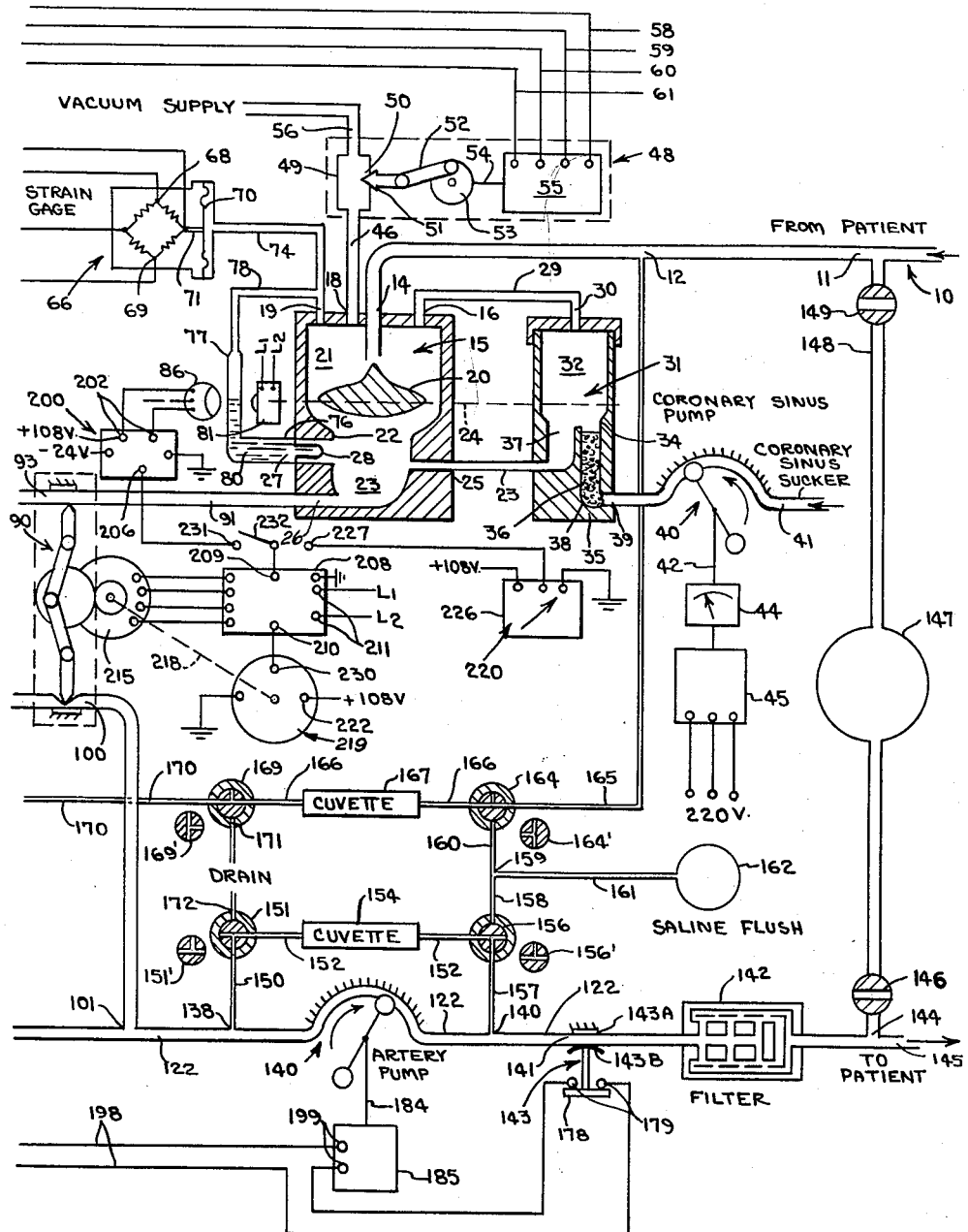

Referring to the drawings, Figures 1A and 1B when arranged side-by-side with Figure 1A at the left and Figure 1B at the right show the entire pump-oxygenator system. When operating, venous blood is received from the patient at line 10 which passes junctions 11 and 12 and enters port 14 in the top of venous reservoir generally designated 15. Venous reservoir 15 is preferably made of Lucite. It has a top wall in which ports 14, 16, 18 and 19 are provided. Port 14 has an extension reaching down into the reservoir aligned with the upper tip of an inverted top-shaped liquid spreader 20 which has a bottom slightly convex downward which intersects the normal liquid level line 24. This construction reduces velocity of blood inflow and discourages splashing. The venous blood reservoir upper cavity 21 is necked in at 22 to blend smoothly into the smaller lower cavity 23. Side ports 25, 26 and 27 are provided in the walls of the lower cavity as shown. Port 27 is largest and is provided with a very flexible rubber diaphragm 28, which separates the blood in the reservoir from a clear liquid at 80, which stands in riser 77.

From port 16, line 29 extends to port 30 in the coronary sinus reservoir generally designated 31. This reservoir has an upper part 32 which curves in as shown along the bottom 34. In the solid bottom 35 there are an entrance riser 36 having a plastic excelsior material 38 which is surface treated with an anti-foam chemical. The coronary inflow of blood, air, foam and bubbles is introduced thru port 39, riser 36 and the material 38, and the air component of the mixture of blood, foam and bubbles is caused to separate from the liquid blood which stabilizes at level 24, the air being drawn thru line 29 to reservoir 15 and then to vacuum line 18. A port 39 connects to the bottom end of riser 36 and extends thru a plastic tube which forms a part of pump 40 and then on at 41, which is the coronary sinus sucker line. The end of line 41 is located by the surgeon at an appropriate place in the resected heart, so as to suck in the venous blood of that organ, which is liberated by the exigencies of surgical procedure. Air is also drawn in by such sucking operation. The pump 40 is of the general types shown in Patents 2,659,368 and 2,705,493. It is driven by shaft 42 thru a manually adjustable variable-speed drive 44 from motor 45 which is preferably a polypose induction motor. Pump 40 produces the only effective suction on line 41 and serves to regulate the volumetric rate of total flow thru the coronary sinus sucker line 41. Pump 40 prevents the unrestricted inflow of air, into line 41 as would occur if a vacuum should be connected directly to the coronary sucker line. Pump 40, in effect, acts as a rotary gate which permits only a certain (adjusted) volume inflow into line 41, and thus greatly restricts the inflow of unwanted air.

Venous input reservoir 15 and the coronary sinus reservoir 31 are connected together above the liquid level 24 by line 29 and connected together below the liquid level by line 23 which enters the bottom of the well 37 of the coronary sinus reservoir. The venous input reservoir 15 is evacuated to a controlled negative pressure, via line 18, and such negative pressure is communicated via line 29 to reservoir 31. An admixture of blood, bubbles and foam thru line 41 and pump 40 enters reservoir 31 thru riser 36 and in passing thru material 38, is encouraged to separate into its liquid blood and air components, the air rising to surface 24 and there separating, being drawn off via line 29, space 21, and line 18. Since the liquid (blood) leaves by down-flow in well 37, bubbles of air (which want to rise) are discouraged from being entrained and easily separate from the flow in 37, since the rate of flow is very slow.

From port 18 of the venous reservoir 15, a line 46 extends to a vacuum control valve generally designated 48. The portion shown within the dotted square 48 of Figure 1, is illustrated in greater detail in Figures 2 or 9 to which reference is now made. The vacuum control valve includes a chamber 49 having connected thereto an unregulated vacuum supply line 56 and a regulated vacuum line at 46. To line 56 there is attached a vacuum supply of 500–600 mm. of Hg capacity. An ordinary laboratory type venturi vacuum device connected to a water tap is sufficient to supply adequate vacuum and capacity. The hollow chamber 49 has a flat top thru which a tapered air bleeder opening 50 (generated arcuately) is made. The rotary blade valve element 51, which is shaped as shown in Figure 2, is mounted on shaft 63, and fits snugly against the upper planar surface of chamber 49. It is arranged to rotate in either direction within the limits of stop 57 as shown by double arrow 47, via gears 52 and slip clutch 53 from shaft 54 of reversible motor 55. Manual rotation via gear 62 and handle 64 is provided. The width of slot 50 decreases in the clockwise direction (as viewed in Figure 2) and as edge 51A moves clockwise, the still uncovered (and hence still effective) area of slot 50 will be decreased. When edge 51A engages stop 57 slot 50 is entirely closed. When edge 51B engages stop 57, slot 50 is entirely open. The open area of slot 50 acts as a bleeder port, which regulates the net vacuum drawn on line 46. When slot 50 is closed the entire vacuum capacity of line 56 is applied to line 46; when entirely open atmospheric air, drawn thru the slot 50 greatly reduces the effectiveness of vacuum line 56 upon line 46. Regulation of vacuum is achieved by varying the size of the uncovered area of slot 50.

The motor 55 is a standard polyphase reversible instrument-type motor which is connected by its four leads 58–61 to motor control amplifier power supply system generally designated 62. The motor 48 and the motor control power supply amplifier system 62 are each standard articles of manufacture, the details of which, per se, form no part of this invention. It is sufficient here to say that system 62 is supplied with alternating current power of standard voltage and frequency via lines L1 and L2 and is connected via four terminals to lines 58–61 leading to motor 55. Two signal input terminals 64 and 65 (here vacuum amount signal), of the control 66 are connected to opposite corners 68 and 69 of a Wheatstone bridge which is a component of a "strain gauge" generally designated 66. This strain gauge 66 is likewise a standard article of manufacture, and contains a vacuum responsive diaphragm 70, connected by post 71 to the Wheatstone bridge, the latter being supplied by a low voltage direct current potential such as battery 72. The diaphragm chamber of "strain gauge" vacuum responsive signal element 66 is connected via line 74 to port 19 of the venous reservoir 15, and is responsive to the vacuum in such reservoir. The control amplifier and power supply has a manual regulator 75. When the vacuum varies in the venous reservoir 15, a unidirection voltage signal which is a function of such vacuum amount is generated at gauge 66 and applied to input terminals 64 and 65 of the unit 62. The latter unit applies an appropriate amount and direction of power supply via lines 58–61 to motor 55, which then rotates in an appropriate direction to vary the position of valve element 51 and accordingly varies the vacuum applied via line 46 to port 18 of the venous reservoir 15, thereby correcting the condition of vacuum.

Manual 75 of control 62 interrupts signal input at terminal 64—65 and applies a manually adjusted voltage signal which may be utilized in place in the "vacuum" responsive incoming signal of the strain gauge at such terminals for manually adjusting vacuum via motor 55. In the event of complete power failure of the vacuum system, vacuum may be controlled manually at 64, see Figure 2.

Reference is now made to Figures 5 and 6, which are representative of the photo-electric arrangement for controlling liquid level in the venous reservoir 15 and also the liquid level in the oxygenator portion of the apparatus, to which reference will later be made. In Figure 5 the reservoir R is representative of a container, either open or closed, in which liquid is maintained to level LL. With reference to the venous reservoir 15, already described, the liquid level is at 24. In respect to the oxygenator, to be described, the liquid level is 124. These designations are shown in Figure 5. To the side of the reservoir and below liquid level there is port 27 connected to a tubular side arm having a horizontal run 76 leading a vertical light transparent riser 77 the top of which is connected via run 78 to port 79, which is above liquid level. In the run 76 (and hence submerged) there is provided a liquid impervious and very flexible diaphragm 28 of tubular shape the periphery of which is sealed to the inside of run 76. The diaphragm material is suited to the liquids involved and here can be of rubber or plastic. In the space 80 there is a clear liquid. Diaphragm 28 is sufficiently flexible and of such thinness as to be responsive to even slight differences in head in reservoir R and riser 77. Diaphragm 28 is tubular and is of sufficient length that when it works back and forth it will suffice to permit equalization of liquid 80 to level LL, throughout the range of required equal level changes. On one side of riser 77 is placed a light source 81 from the lens of which a parallel ray light beam 82 is focused on transparent riser 77. On the other side of riser 77 there is located photocell 86, the aperture 86A of which, is aligned with the axis of light beam 82.

The transparent tube 77 when empty of liquid 80, acts to disperse the light beam to path 85, and the photocell 86 is not sufficiently illuminated to provide an effective signal. When the liquid level rises in riser 77, the clear liquid and riser 77, in conjunction, act as a lens which serves to focus the light rays along paths 84 and hence into cell 86, which accordingly produces an effective signal. The diaphragm 28 separates the liquid B, which may be opaque or translucent such as blood, from the clear liquid 80. Hence the liquid level is photo-electrically sensed regardless of the character of light transmissibility of liquid B, which here is blood. Riser 77 is shown as being of circular cross-section, but can have a cross-section of lens shape.

Photo-electric liquid level signals are utilized at two locations in the present apparatus. The first location is in respect to the venous reservoir 15, the liquid level of which is used for controlling the operation of the occluder valve system 90, see Figures 1A, 1B, 3, 4, and 7. The second location is in respect to the oxygenator 104, the liquid level of which is utilized to control the rate of operation of the artery pump 140 of the system. See Figures 1A, 1B and 8. The specific circuitries for these applications are described hereinafter.

Referring to Figures 1A and 1B, from port 26 of reservoir 15 a plastic pipe 91 extends thru nip 93 of occluder valve mechanism 90 and thence thru T 92 and T 94 to and thru the recirculation pump 98 (of which tube 91 is a part). At T 92 a branch extends thru shut-off valve 95 to donor blood supply reservoir 96 which is preferably calibrated for volume. From T 94 line plastic pipe 99 extends thru nip 100 of occluder valve mechanism 90 and thence to junction 101. From junction 94 the plastic tubing 91 extends thru junction 174 and thence directly thru the mechanism of recirculation pump 98, which like pump 40, is of the type shown in Patents 2,659,368 and 2,705,493, thence directly thru the nip of high pressure stop switch 102 to inlet port 103 of the oxygenator generally designated 104.

The oxygenator 104, per se, is of the design used by Gibbon. Briefly it consists of a chamber 105 having a blood distribution space 106 at the top equipped with a distributor shelf 108, which is provided with slits in it thru which blood is flowed onto a plurality of vertically disposed screens 109 for distributing as uniformly as possible a layer flow of blood on the screens. An atmospheric vent port 110 at an upper part of the chamber is connected to vent line 111. It is noted, parenthetically, that line 111 should be carried safely outside the operating room since, during operation, it will contain a mixture of oxygen and ether in possibly explosive proportions. Such vapors must therefore be safely vented. At a lower part of the chamber 105 there is provided a gas inlet line 112 which is connected at T 114 and thru pressure regulator valve 115 to an oxygen supply 116 and thru branch 118 and regulator valve 119 to a carbon dioxide supply line 20. An ether inlet may be provided on line 112, if desired.

The normal liquid level of oxygenator 104 is at 124. The liquid level control is by means of a side arm tube on the tank 105, like that already described for venous reservoir 15. The side arm tube starts at port 127, thence thru horizontal run 129 and vertical light transparent riser 132 and upper return 134 to tank 105. Horizontal run 129 contains a very flexible diaphragm 128 which, like 28 of Figure 5, is very flexible, thin and tubular, for the reasons stated relative element 28. Liquid 130 is transparent. Light source 133 is like source 81 and photocell 131 is like photo-cell 86. The operation is also similar. When the blood level 124 rises, the transparent liquid 130 also rises, and in cooperation with transparent riser 132, acts as a lens to concentrate light upon cell 131, to produce a signal. When the blood level falls, liquid 130 also falls in tube 132, and then tempty or partially empty tube 132 disperses the light from source 133 so that it does not fall upon cell 131 and the signal ceases or decreases sufficiently so as not to be effective. The presence or absence of a prescribed signal valve at cell 131 is utilized for controlling the artery pump 140, which is caused to pump faster when the blood level rises, and slower when the blood level falls.

The admixture of $O_2$ and $CO_2$, oxygenates the hemoglobin of the blood in oxygenator 104, and ether may also be introduced for anesthesia, during operation. From the downwardly sloping bottom of oxygenator 105, and attached to port 121 is a plastic tube 122, extending through junctions 101, 138 thence through and forming a part of pump generally designated 140, thence thru the nip 141 of adjustable high pressure stop switch 143, thence thru filter 142 and junction 144 to the artery cannula connection 145. From junction 144 a line extends through shut off valve 146 to priming tank 147 of several liters capacity having a removable top, and through which all liquids (except donor blood) are introduced into the system. This may include sanitizing, and sterilizing liquids, saline solution and blood for priming the system. From tank 147 line 148 extends thru valve 149 to junction 11. For priming the system the venous line 10 and artery line 145 are clamped off and valves 146 and 149 are opened until priming is completed. When operating, lines 10 and 145 are opened, valves 146 and 149 closed.

For measuring the percentage oxygen saturation of the hemoglobin of the blood flowing through the venous blood input line 10 and for correspondingly measuring such percentage concentration of the arterial blood delivered thru line 122—145 to the patient, there are used continuously recording oxi-meters made in accordance with U.S. Patents 2,706,927 and Ser. No. 460,030 filed October 4, 1954. For sensing purposes such oxi-meters require the flow of blood through a slender plastic tube which runs through an instrument called a "cuvette." Two such cuvettes are used here at 167 (for venous blood sensing) and 154 (for arterial blood sensing). The piping for these cuvettes and their valving and flushing system, is as follows: For the arterial blood cuvette 154, the line starts at junction 138 and continues via two-position valve 151 through a slender plastic tube 152 which may extend straight through and form a part of the cuvette 154, thence through two-position valve 156 and via line 157 to junction 140. For the venous blood, the piping starts at junction 12 and continues via line 165, through two-position valve 164 and through a similar slender plastic tube 166 which extends through and may form a part of cuvette 167, thence through two-position valve 169 and line 170 and to junction 174 on line 91. Each of the valves 151 and 156 and the valves 164 and 169 can be set in the positions shown, to permit flows of venous blood input and arterial blood output through the venous blood percentage-oxygen sensing cuvette 167 and the arterial blood percentage-oxygen sensing cuvette 154, respectively. In addition when the valves 151, 156, 164 and 169 are placed in the positions as shown at 151', 156', 164' and 169', (as shown in the small sketches adjacent each valve), the cuvettes may be flushed from saline solution flush tank 162, via line 161 to T 159, and thence via line 158, valve 156 (set to position 156') cuvette tube 152, valve 151 (set to position 151') and drain line 172; also from junction 159, line 160, valve 164, (set to position 164'), tube 166, valve 169 (set to position 169') to drain line 171.

The adjustable over-pressure stop switches 103 and 143 are similar. Referring to switch 103, the plastic tube 91 after passing thru pump 98, is compressed slightly by the nip 102 which has a solid pad 102A on one side of the plastic tube and a movable pad 102B which is biased by an adjustable spring (not shown) so as partially to squeeze the tubing 91. In the normal position the movable pad 102B, which is connected by a stem to switch contact 175, holds the contact closed against, and completes an electric circuit between, contacts 176. When the pressure in tube 91 exceeds a predetermined limit it will expand and cause this circuit to be opened. Similarly in respect to switch 143, tube 122 is held in the nip 141 between stationary pad 143A and actuated by pressure responsive pad 143B. Pad 143 is connected to switch 178 which serves either to bridge, and hence complete a circuit between, contacts 179, when pressure in tube 122 is normal, or to open such contacts if the pressure exceeds a certain amount.

All of the pumps 40, 98 and 140 are similarly constructed, and are of the positive displacement tube and roller type, as shown in Patents 2,659,368 and 2,705,493. Pumps 40 and also 98 are constantly driven, each at a manually adjustable speed. Polyphase motor 45 drives adjustable variable speed transmission 44 to rotate shaft 42 of pump 40. Polyphase motor 180 drives adjustable variable speed drive 181 to turn shaft 182 of pump 98. The power supply for motor 180, (one or more phases) is taken thru the contacts 175—176 of switch 103 so as to stop motor 180 if excess pressure develops.

Referring to Figures 1A, 1B and 8, the shaft 184 of artery pump 140 is driven by a variable speed direct current motor 185 thru a speed reduction gear not shown. The motor 185 is a stock item in the servo-systems art, and is provided with a power supply and self contained magnetic amplifier system generally designated 186, also a stock item. It works as follows: When liquid level of blood rises in oxygenator 104, this causes clear liquid 130 to rise in tube 132, see Figures 1A and 8, and concentrates light from lamp 133 upon photocell 131 to generate a signal which is applied to terminals 195 of pre-amplifier 190, the latter being supplied with 108V (positive) at terminal 191; 24V (negative) at terminal 192 and grounded at 194. The amplified, (in this illustration, liquid level increases), signal at terminals 189 of the pre-amplifier is applied to signal input terminals 188 of the artery pump motor control power supply and amplifier 186. Alternating current from lines L1 and L2, supplied to terminals 187 is modulated and rectified by the signal at 188 and delivered as a direct current output at terminals 196, the voltage being a function of the signal received at 188. Since the artery pump serves to increase withdrawal of blood from the oxygenator 104, in response to increase of blood level therein above level 124, such increase in level occasions an increase in voltage (and hence speed of) motor 185, accordingly to cause pump 140 to withdraw blood from oxygenator 104 at an increased rate, thereby reducing the level 124. The converse is true when the liquid level decreases. Overpressure safety switch 177—178 interrupts line 198 to motor 185 in the event of excessive pressure in line 122.

Referring to Figures 1A and 1B, and 3, 4, and 7, these show the motor and controls by means of which the occluder valve generally designated 90, is operated. According to our invention it is the desideratum, in respect to the occluder valve 90, that as one line (for example 91) is squeezed at the nip 93 to restrict its flow, the other line 99 should be less squeezed at its nip 100, to increase its flow. Stated another way, in accordance with our invention it is the objective and result that when the photocell 86 senses a reduction in liquid level in reservoir 15, the rate of blood withdrawal therefrom should be decreased and the occluder valve 90 is accordingly actuated to squeeze the nip 93 to pinch tube 91 partially and restrict flow out of reservoir 15, but at the same time to allow a substantially corresponding increase of recirculatory flow. Hence, as tube 91 is partially restricted, at the same time the nip 100 opens, freeing tube 99 to permit increased recirculation of blood. Similarly when the photocell 86 senses an increase in level of blood in reservoir 15 the reverse function is occasioned, line 90 being squeezed less to permit greater blood withdrawal therethru and line 99 is squeezed more to decrease the rate of blood recirculation. This functioning is achieved here, by a system in which certain standard recording instrument motor, motor power supply, amplifier and potentiometers are utilized.

Thus photocell 86 is connected to input terminals 202 of pre-amplifier 200 having 108 V. (positive) supply terminal 201; 24 V. (negative) supply terminal 205 and ground 204. The amplified output is delivered at 206 as a positive voltage, the value of which is a function of the liquid level in tube 77. Such voltage signal at 206 is applied to contact 231 of the single pole double pole switch 231—232—227, and with switch blade 232 on terminal 231, such voltage of terminal 206 is applied to input terminal 209 of a standard motor power supply and amplifier 207 which is also a stock item. This amplifier power supply 207 has 110 VAC input at 211, ground 208, and a response input at 210 the voltage on which is brought into balance by the operation of a potentiometer 219 which is geared at 218 so as to be driven when valve gear 240 is rotated. The voltage produced at terminal 230 of the potentiometer 219 is a function of valve position. The device (here valve 90) is driven by motor 215 from supply 207 and the motor likewise turns potentiometer 219. The supply 207 delivers polyphase power in appropriate phase and amount at terminals 212 for application to terminals 214 of motor 215, which in consequence rotates shaft 241 in one direction on the other, according to whether the signal input at 211 is more or less than the previous setting.

As shown in Figures 3 and 4, shaft 216 of the motor is geared at 223 to drive gear 240 and hence rotate shaft 241 in one direction or the other as shown by arrow 250. The walls 244 and 245 form the frame of the occluder valve 90. Shaft 241 carries crank disk 241A which rotates in a recess in base 242. On disk 241A there is an upstanding crank pin 246 on which roller 247 turns. The space between wall 244 and the periphery of roller 247 forms the nip 93 thru which plastic tube 91 extends. The space between wall 245 and roller 247 forms the nip 100 thru which plastic tube 99 extends. When crank pin 246 and roller 247 are midway between walls 244 and 245 both tubes 91 and 99 are equally compressed to an amount such that the sum of the cross-sectional areas of such two partially compressed tubes about equals the cross-sectional area of either tube when not compressed. Rotation of shaft 240 clockwise from the mid-position additionally compresses tube 99 and releases tube 91, while rotation counterclockwise from the mid-position causes a reversed effect. As shown tube 99 is open and tube 91 is compressed to substantially its maximum extent.

The arrangement of valve 90 as shown has the characteristic that within wide valving limits, the sum of the cross-sectional areas of tubes 91 and 99 each measured at its nip, will be about constant, with the result that as flow thru one is decreased thru a given increment the flow thru the other will be increased thru substantially an equal increment, and vice versa.

To gear 240 there is mated gear 218 of a slide wire potentiometer 219 having 108 V. D.C. input terminal 222, slider output terminal 230 (voltage variable upon position) and a ground terminal. As shaft 241 and gear 240 are rotated gear 218 is also rotated and slider 229 (see Figure 7) is moved to a position such that it provides a voltage output which is representative of the angular position of rotation of shaft 241. The voltage of terminal 230 is applied back to response terminal 210 of motor power supply and amplifier unit 207. This unit 207 supplied power to motor 215 in an amount and phase displacement appropriate to cause rotation of valve 90 in an appropriate direction until the voltage applied to response terminal 210 equals that at signal input terminal 209. Then unit 207 discontinues the supply of power to motor 215 which accordingly ceases rotation until a different signal from photocell 86 occasions another setting of the occluder valve 90.

For manual operation of the occluder valve there is provided another potentiometer 220 having a manually adjustable slider (and terminal) 226 which is connected to terminal 227 of the double pole switch.

When contact 232 is on terminal 227, and slider contact 226 is manually adjusted the motor 215 and valve 90 will then follow to the position occasioned by position of adjustment of 226, rather than to be responsive to the photocell 86. This facilitates manual operation during initial and final parts of the operation.

By way of specific illustration but not as a limitation, specification of particular stock items may be mentioned as follows:

Relative Figures 3, 4 and 7:
  Motor 215—Minneapolis Honeywell Motor, Catalogue Number 76750-3
  Motor Supply and Amplifier 207 (for motor 215)—Minneapolis Honeywell Catalogue Number 356413-1

Relative Figure 7:
  Pre Amplifier Tube—No. 6AQ5
  Potentiometer 219—Beckman Instruments, Inc. Helipot Model 2500GZ; 2500 ohms
  Potentiometer 220—Ohmite Type A B; 2500 ohms Relative Figures 1 and 8:
  Pre Amplifier Tube—No. 6AQ5
  Artery Pump Supply Amplifier 186—Vickers Magnetic Amplifier Catalogue No. 2509

Relative Figures 1L and LR:
  Strain gauge Vacuum Sensing Unit 66—Statham Laboratories Catalogue No. P5-0.4D-350

The operation of the herein described pump-oxygenator apparatus is described in an article entitled "Apparatus of the Gibbon Type for Mechanical Bypass of Heart and Lungs," by Richard E. Jones et al., pages 105–113, and in an article entitled "Experiences with a Heart-Lung Bypass (Gibbon Type) in the Experimental Laboratory" by David E. Donald et al., pages 113–115, which appeared in the Proceedings of the Staff Meetings of the Mayo Clinic, volume 30, Number 6, the same being incorporated herein by reference.

Initially the system may be full of saline solution and lines 10 and 145 are closed by clamps, and valves 146 and 149 ore opened. Saline in reservoir 147 is circulated. Line 145 is opened and valve 146 closed, to pump down the saline in tank 147. When the latter is empty blood is introduced in tank 147 and the blood is pumped in behind the saline. As the saline is flushed, line 145 is clamped and valve 146 opened and the system then circulates blood, and operation is checked.

Pre-operative pressure measurement is taken by means of a tiny strain gauge on the end of a cannula, inserted into the central venous system of the patient, by known surgical technique. Such pressure is variable as the heart pumps but is normally in the range of 2 to 10 mm. Hg pressure, positive. It has been found that good venous blood delivery from the patient during the operation, while the patient's heart and lungs are out of service, will be occasioned by maintaining the central venous pressure of the patient a steady pressure within this range, preferably in the range of 2–5 mm. Hg pressure positive. Now the physical elevation of the patient is usually a little higher than the venous reservoir 15. Also there is a pressure drop in the cannula leading from the patient to tube 10 and thru the tube 10 to reservoir 15. The difference in static head and line pressure drop is taken into consideration and a carefully regulated pressure (normally negative) is maintained in reservoir 15 which, when the apparatus is functioning, will produce at the end of the venous cannula that is introduced into the patient, just the proper pressure to draw in the venous blood that is delivered but not at such a rate that the central venous pressure would decrease below a prescribed positive pressure, say of 2 mm. Hg. In this way collapse of the patients' veins is prevented and good delivery of venous blood is obtained. The pressure in venous reservoir is normally 2–5 mm. Hg negative. All pressures are measured relative atmosphere pressure.

No attempt will here be made to describe surgical procedure, it being sufficient for present purposes, to mention that the venous blood is delivered via lines 10 and via coronary sucker line 41. Pump 98 ordinarily circulates blood from and to oxygenator 104 at a rate slightly in excess of the delivery rate via pump 140. The rate of pump 98 may be adjusted by runs steadily at any position of adjustment. However, input to pump 98 may be entirely from recirculation line 99 or predominately from venous blood supply line 91, or some from each, the proportion depending on the position of occluder valve 90. The rate of input via line 91 (to pump 98) is regulated by nip 93 of valve 90, which is in turn responsive to the liquid level 24 in reservoir 15. As the level increases, nip 93 is opened and the venous inflow increases until the level 24 is again brought down. The system holds valve 90 at a position to maintain level 24 within close limits even though inflow from the patient to reservoir 15, via line 10 may vary.

As a consequence of the foregoing, as the level 124 in the oxygenator increases, pump 140 is speeded up to increase the rate of return to the patient. Donor blood is introduced by opening valve 95.

As the system is taken off, the levels 24 and 124 can be pumped down by switching to manual control.

It is noted that in Figure 1B, the mechanisms of valves 90 and 49—54 are shown in slightly different mechanical forms than in the detailed views of Figures 3 and 4 and Figure 2, respectively. The specific illustrations of these components in Figure 1B may be regarded as modified forms.

In accordance with the provisions of the patent statutes, we have herein described the principle of operation of this invention, together with the elements which we now consider the best embodiments thereof, but we desire to have it understood that the structures disclosed are only illustrative and the invention can be carried out by other means. Also, while it is designed to use the various features and elements in the combinations and relations described, some of these may be altered and modified and used separately without interfering with the more general results outlined and the invention extends to such use within the scope of the appended claims.

As many apparently widely different embodiments of this invention may be made without departing from the spirit and scope thereof, it is to be understood that we do not limit ourselves to the specific embodiments herein,

What we claim is:

1. The combination comprising an oxygenator container having means therein for exposing liquid to gases for absorption of gases within the container, said oxygenator container including gas inlet port, liquid inlet port, and liquid outlet ports, circulation pump means having a delivery port connected through a recirculation line to said oxygenator liquid inlet port and an input port connected to said oxygenator outlet port for circulating liquid from the outlet port to the inlet port of said oxygenator container, a venous blood reservoir having an inlet line and means connected to the reservoir for maintaining a prescribed reduced pressure therein for drawing blood through said inlet line and into said reservoir, a venous line connecting said reservoir directly to the input port of said circulation pump means and artery delivery means connected to the oxygenator container outlet port for withdrawing blood therefrom, said combination is further characterized in that it has means connected to said venous line and recirculation line, said means being responsive to the liquid level in said venous reservoir for decreasing the flow through said venous line and increasing the flow through said recirculation line when the blood level in said reservoir decreases and for increasing the flow through said venous line and decreasing the flow through said recirculation line when said level increases.

2. The combination comprising an oxygenator container having means therein for exposing blood to gases for absorption therein of gases within the container, said oxygenator having a gas inlet port and blood inlet and outlet ports, venous blood supply means connected to said blood inlet port and artery blood delivery means connected to said oxygenator outlet port, a blood-air separator having an inlet port, a separate air withdrawal port and a separated blood outlet port, the latter being connected to the inlet port of the venous blood supply means, a coronary sucker line connected to the inlet port of the blood-air separator, and a pump in said coronary sucker line.

3. The combination comprising an oxygenator container having means therein for exposing blood to gases for absorption therein of gases within the container, said oxygenator having a gas inlet port and blood inlet and outlet ports, venous blood supply means connected to said blood inlet port and artery blood delivery means connected to said oxygenator outlet port, a blood-air separator having an inlet port, a separate air withdrawal port and a separated blood outlet port, the latter being connected to the inlet port of the venous blood supply means, a coronary sucker line connected to the inlet port of the blood-air separator, and means connected to said coronary sucker line is provided for introducing antifoam material into the flow passing through said coronary sucker line.

4. The combination comprising an oxygenator container having means therein for exposing blood to gases for absorption therein of gases within the container, said oxygenator having a gas inlet port and blood outlet and inlet ports, venous blood supply means connected to said blood inlet port and artery blood delivery means connected to said oxygenator outlet port, a blood-air separator having an inlet port, a separate air withdrawal port and a separated blood outlet port, the latter being connected to the inlet port of the venous blood supply means, and a coronary sucker line connected to the inlet port of the blood-air separator, said apparatus being further characterized in that said separated blood outlet port includes a vertically extending portion which opens directly into said blood-air separator.

5. The combination comprising an oxygenator container having means therein for exposing blood to gases for absorption therein of gases within the container, said oxygenator having a gas inlet port and blood inlet and outlet ports, venous blood supply means connected to said blood inlet port and artery blood delivery means connected to said oxygenator outlet port, a blood-air separator having an inlet port, a separate air withdrawal port and a separated blood outlet port, the latter being connected to the inlet port of the venous blood supply means, a coronary sucker line connected to the inlet port of the blood-air separator, and a positive displacement pump in said coronary sucker line.

6. The combination comprising an oxygenator container having means therein for exposing blood to gases for absorption by the blood of gases within the container, said oxygenator having a gas inlet port and blood inlet and outlet ports, venous blood supply means connected to said oxygenator blood inlet port, said supply means including a venous blood reservoir having a blood inlet and a blood outlet, the latter being connected to the oxygenator blood inlet port, a vacuum supply connected to the venous blood reservoir, and a vacuum regulator connected to the vacuum supply and responsive to the vacuum in said venous blood reservoir for maintaining a regulated amount of vacuum therein.

7. The combination of claim 6 further characterized in that said vacuum regulator includes a vacuum responsive means connected to the venous blood reservoir for producing an electrical signal which is a function of the amount of vacuum in said reservoir and an electrically operated vacuum control connected to said vacuum responsive to said signal.

8. The combination comprising an oxygenator container having means therein for exposing blood to gases for absorption by the blood of gases within the container, said oxygenator container having a gas inlet port and a blood inlet port and a blood outlet port, venous blood supply means including a venous blood reservoir having a venous blood outlet connected to the blood inlet port of said oxygenator container and a coronary sinus reservoir positioned adjacent the venous blood reservoir so as to permit a common normal blood level to be established in both reservoirs, a connection between said reservoirs above said common blood level, a blood outlet extending from a lower part of the coronary sinus reservoir and connected to the venous blood reservoir, a venous blood inlet for said venous blood reservoir, a coronary sinus inlet in said coronary sinus reservoir, said coronary sinus inlet being connected thru a gate for regulating the flow thru said coronary sinus inlet to a prescribed volumetric rate and a vacuum source connection for said reservoirs.

9. The combination of claim 8 further characterized in that said gate is adjustable for varying the volumetric rate of flow through said gate.

10. The combination of claim 8 further characterized in that said gate is a rotary positive displacement pump.

11. The combination of claim 8 further characterized in that said coronary sinus inlet opens upwardly into the coronary sinus reservoir.

12. The combination of claim 8 further characterized in that said coronary sinus inlet includes therein means for treating the flow therethru with an anti-foam material.

13. The combination of claim 8 further characterized in that the outlet from said coronary sinus reservoir extends downwardly from said reservoir and thence continues to the venous blood reservoir.

14. The combination of claim 8 further characterized in that said venous blood reservoir is provided with a liquid level responsive device and means is provided and connected to the venous blood outlet of said venous blood reservoir and to said oxygenator blood inlet for regulating the flow of blood from the venous blood reservoir for maintaining the normal blood level substantially constant.

15. The combination of claim 8 further characterized in that a vacuum line is connected to said venous blood reservoir and a vacuum responsive device is provided and is connected to the venous blood reservoir above said normal blood level and is connected to said vacuum line for closely regulating the vacuum applied to said venous blood reservoir by said line.

16. The combination of claim 8 further characterized in that a delivery pump is connected to the blood outlet port of said oxygenator container for withdrawing blood therefrom.

17. The combination of claim 8 further characterized in that liquid level responsive means is connected to the oxygenator container, and a delivery pump is connected to the blood outlet port of said oxygenator container and said delivery pump is connected to said liquid level responsive means for increasing the rate of delivery of said pump as the liquid level in said oxygenator increases and vice versa.

18. The combination of claim 8 further characterized in that a line having a circulation pump therein is connected between the blood inlet and outlet ports of the oxygenator container.

References Cited in the file of this patent

UNITED STATES PATENTS

| | | |
|---|---|---|
| 2,659,368 | Gibbon et al. | Nov. 17, 1953 |
| 2,689,565 | Gobel | Sept. 21, 1954 |
| 2,705,493 | Malmros et al. | Apr. 5, 1955 |

OTHER REFERENCES

Gibbon: Surgery, Gynecology and Obstetrics, vol. 69, No. 5, November 1939, pp. 602–614 (pp. 603–608 relied on).

Clowes: Annals of Surgery, vol. 134, No. 6, December 1951, pp. 958–59.

Miller et al.: Journal of Thoracic Surgery, vol. 26, No. 6, December 1953, pp. 600–603, 616. (Available in Division 55.)

Jones et al.: Proceedings of the Staff Meeting, Mayo Clinic, vol. 30, No. 6, March 23, 1955, pp. 106–112. (Available in Scientific Library.)

UNITED STATES PATENT OFFICE

CERTIFICATE OF CORRECTION

Patent No. 2,927,582                                            March 8, 1960

John W. Berkman et al.

It is hereby certified that error appears in the printed specification of the above numbered patent requiring correction and that the said Letters Patent should read as corrected below.

Column 6, line 18, for "and then tempty" read -- and the then empty --; column 9, line 29, for "occasionad" read -- occasioned --; line 68, for "ore" read -- are --; column 12, line 28, before "to said signal" insert -- means and responsive --.

Signed and sealed this 30th day of August 1960.

(SEAL)
Attest:

ERNEST W. SWIDER                                            ROBERT C. WATSON

Attesting Officer                                                   Commissioner of Patents